United States Patent

[11] 3,614,200

[72] Inventor George William Taylor
Princeton, N.J.
[21] Appl. No. 875,822
[22] Filed Nov. 12, 1969
[45] Patented Oct. 19, 1971
[73] Assignee RCA Corporation

[54] LIGHT VALVE MATRIX
8 Claims, 2 Drawing Figs.

[52] U.S. Cl. ................................................ 350/150,
340/173 LS, 350/151
[51] Int. Cl. .................................................. G02f 1/26
[50] Field of Search ........................................... 350/150,
151, 157; 340/173 LT, 173 LS, 173 LM; 178/5.4
.BD, 7.3 D

[56] References Cited
UNITED STATES PATENTS
2,077,031 4/1937 Birch-Field ................... 350/151
2,936,380 5/1960 Anderson ...................... 350/150
3,027,806 4/1962 Koelsch et al. ............... 350/150

Primary Examiner—David Schonberg
Assistant Examiner—Ronald J. Stern
Attorney—H. Christoffersen ABSTRACT: A light valve matrix having rows on a first optically active element and columns on a second optically active element in the path of a beam of polarized light. In response to a control signal applied to a row or column, the portion of the element beneath the row or column rotates or retards the plane of polarization of the light through an angle $\theta_2$ and the remainder of the element rotates or retards the plane of polarization of the light through a different angle $\theta_1$, which may be zero. A polarization angle discriminator means such as a polarizer located between the two elements blocks the light at angle $\theta_1$ and passes all or most of the light at $\theta_2$ and a second polarizer placed after the second element blocks the light rotated through an additional angle $\theta_1$ and passes all or most of the remaining light.

INVENTOR
George W. Taylor.
BY H. Christofferson
ATTORNEY 3,614,200

LIGHT VALVE MATRIX

BACKGROUND OF THE INVENTION

Arrays of light valves are essential components in many optical systems. These arrays may be used as optical selectors, page composers for optical memories, and as displays.

Light valve matrices known in the art are limited in speed of operation and in many instances transmit light through a partly opened valve in the matrix.

It is the object of this invention to provide a light valve matrix which operates at relatively high speeds and which transmits light only through a selected valve.

BRIEF SUMMARY OF THE INVENTION

First means responsive to an applied control signal causes the light passing through one restricted region thereof to have one polarization and the light passing through other regions thereof to have a different polarization. Polarization angle discriminator means in the path of the light passing through the first means passes that portion of the light at the one polarization and substantially blocks that portion of the light at the different polarization. Second means in the path of the light passed through the polarization discriminator means, responsive to a control signal, changes the angle of polarization of the passed light one amount in one restricted region of the passed light and changes the angle of polarization of the passed light in other regions another amount. Second polarization angle discriminator means in the path of the light passing through the second means passes that portion of the light whose angle of polarization has been changed one amount and substantially blocks the remainder of the light.

DETAILED DESCRIPTION

Figure 1:
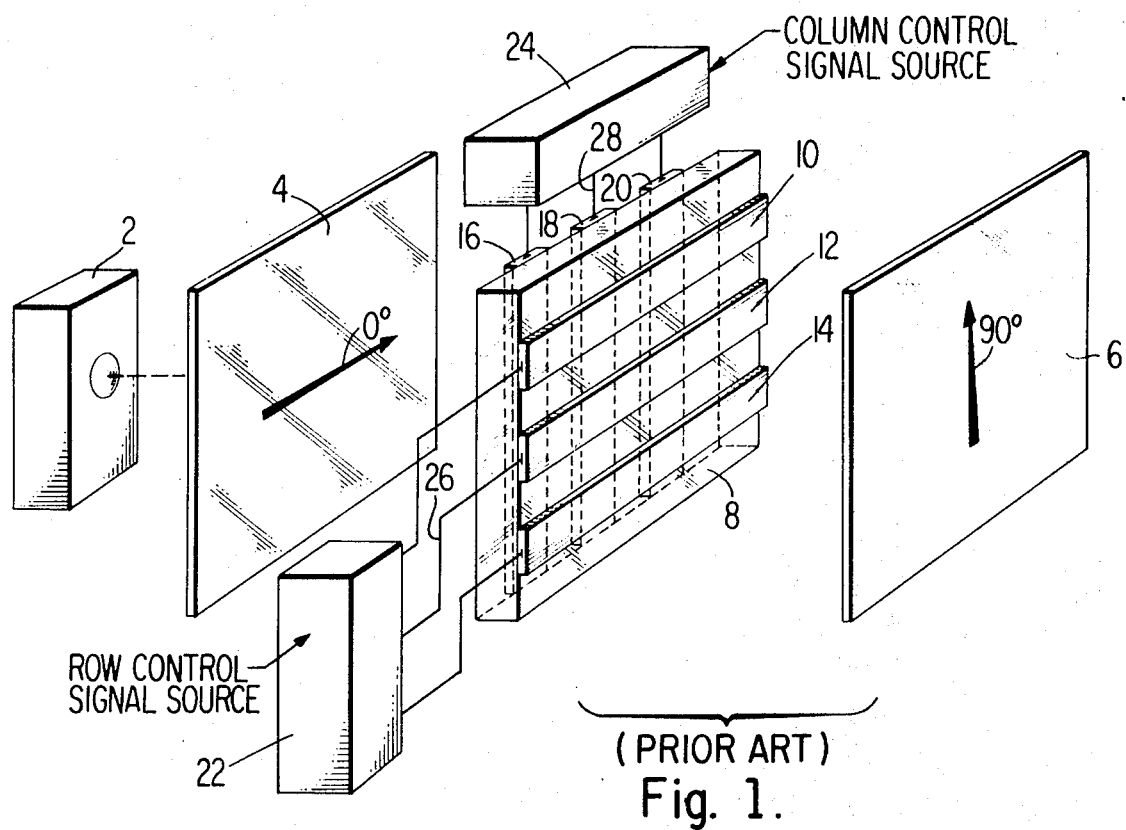
FIG. 1 is a schematic drawing of a light valve matrix known in the art.

FIG. 1 illustrates a light valve matrix which is known in the art. It includes a source of coherent light 2 which, for example, may be a laser, and first and second polarization angle discriminator means such as polarizers 4 and 6, respectively. Situated between the polarizers is an optically active element 8 which may be made of a ferroelectric, ferromagnetic or electro-optic material. Transparent row electrodes 10, 12 and 14 are formed on one face of element 8 and transparent column electrodes 16, 18 and 20 are formed on the opposite face thereof. These electrodes, for example, may be made of tin oxide (TIC) or a semitransparent metal such as gold. A source of row-energizing control signals 22 is connected to the row electrodes and a source of column-energizing control signals 24 is connected to the column electrodes. The polarizers 4 and 6 are usually cross-polarized, that is, their axes of polarization are mutually perpendicular.

The optically active element 8 has a natural threshold, that is, in response to a control signal greater than $V_T$, the element will rotate or retard incident polarized light from a first to a second angle of polarization. In a matrix of this type, therefore, to open a particular light valve, a light valve comprising the intersection of a row and column electrode requires that the energizing control signal on a particular row or a particular column be less than the threshold signal $V_T$ and that the row plus the column-energizing control signal be greater than $V_T$ to open the light valve.

The switching speed of the matrix is proportional to the sum of the column and row signals. It may be seen, therefore, that the speed of operation of this type of matrix is limited in that neither the row nor the column control signal can greatly exceed $V_{T/2}$, otherwise only a single signal (a so-called "half-select" signal) plus noise could cause a valve to open. Typically, the switching speed of a ferroelectric matrix of this type is about 10 microseconds.

To illustrate the above, consider the case in which the element is a ferroelectric and it is desired to open the center light valve of the matrix which comprises the intersection of the row 12 and the column 18. A control signal of amplitude S/2 is applied from the source 22 via a line 26 to the transparent electrode 12. A control signal of amplitude $-S/2$ is applied via line 28 from the source 24 to the column electrode 18. The difference between these two signals, S, is greater than $V_T$ and opens the valve. Light from the coherent light source 2 is plane polarized by the polarizer 4 to some angle $\theta_1$. The light impinging on the open valve is rotated to some other angle, for example, $\theta_2$. For ease of illustration, consider $\theta_1$ equal to 0° and $\theta_2$ equal to 90° and that polarizer 4 has an axis of polarization at 0° and polarizer 6 has an axis of polarization at 90°. The light emerging from the open valve, therefore, is rotated to 90° and is transmitted by the polarizer 6 at an amplitude of $I_0 \sin^2(\theta_2 - \theta_1)$ and is equal, therefore, to $I_0$. The light emerging from the unopened valves is not rotated and emerges from these valves at a polarization angle of 0° and is substantially blocked by the polarizer 6.

In most ferroelectric materials there is no true threshold $V_T$. With an element 8 of this type, each time a voltage S/2 is applied to a nonselected valve, the valve partially opens. Therefore, unless each nonselected valve is reset periodically, the successive half-select pulses of amplitude S/2 applied to that valve will, in due course, fully open that valve. This, of course, is highly disadvantageous. Also, there is a problem in a large matrix in which the material has a good threshold. The problem is that the sum of the light emitted by the half-selected valves on the selected row and the selected column may exceed the allowable noise level of the material.

Figure 2:
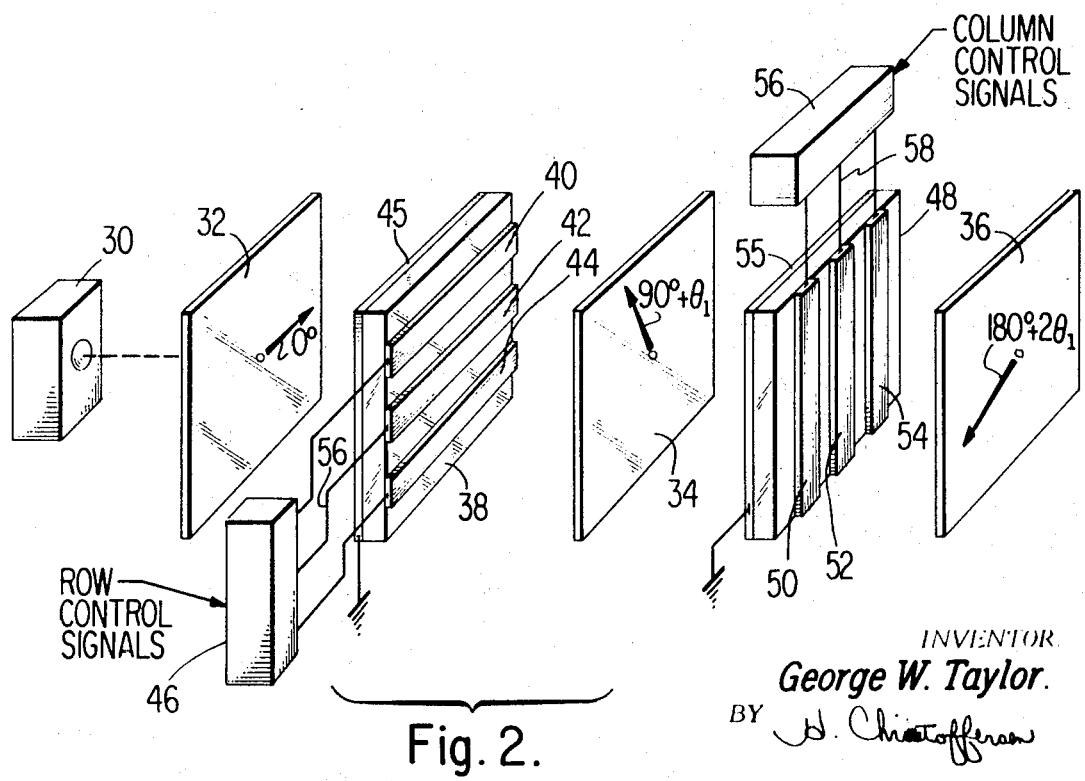
FIG. 2 is a schematic drawing of a light valve matrix which embodies the invention.

FIG. 2 illustrates the new and improved light valve matrix which embodies the invention. The light valve matrix operates at a higher speed than the previously described matrix in that it is not limited by the magnitude of the energizing control signal which may be applied to the respective row and column electrodes, since the row and column electrodes are situated on different elements. This permits a row- or column-energizing control signal to be greater than $V_T$, which, in ferroelectrics, results in switching speeds of 0.1 microsecond or faster. The matrix to be described also does not have the disadvantage of transmitting light from half-selected valves in the matrix. These facts will become clear from the subsequent explanation.

The system includes a coherent light source 30 and first, second, and third polarization angle discriminator means such as polarizers 32, 34 and 36. Situated between the polarizers 32 and 34 is an optically active element 38 which has on one face thereof transparent electrodes 40, 42 and 44 which define the rows of a matrix. A transparent common back electrode 45 is formed on the other face of element 38. A source of row-energizing control signals 46 is connected to the row electrodes.

Situated between the polarizers 34 and 36 is an optically active element 48 formed with transparent column conductors 50, 52 and 54 on one face thereof and a column transparent electrode 55 on the other face thereof. Connected to the respective column electrodes is a source of energizing control signals 56.

It is understood that the electrodes need not be transparent if certain elements are used. For example, transparent electrodes are not necessary if magneto-optic materials are used. For such a material a row or column is defined as the region between two electrodes.

The polarizer 32 has an axis of polarization of 0°. The polarizer 34 has an axis of polarization of 90° plus $\theta_1$. The polarizer 36 has an axis of polarization of 180° plus $2\theta_1$.

The optically active elements 38 and 48 may be formed of a ferroelectric material such as lead zirconate titanate (PZT) or single crystal $Bi_4Ti_3O_{12}$ or one of many other ceramic and single crystal ferroelectrics. Alternatively, the elements 38 and 48 may be formed of a magneto-optic (ferromagnetic) material such as turbium iron garnet or one of many other such materials which are well-known in the art. As another alternative, the aforementioned elements may be formed of electrooptic crystals such as first order crystals potassium dihydrogen phosphate (KDP) or barium strontium niobate or any well-known first order crystal. Second order crystals such as KTN or nitrobenzene may also be used in the practice of the invention.

The electrode structure is illustrated as being transverse to the light path, however, in the case of some ferroelectrics such as $Bi_4Ti_3O_{12}$ and some modes of operating electro-optic crystals, the electrode structure is parallel to the path of the light. In these cases each row and column element is constructed of a single crystal and each row element is separated from another row element by an insulator such as Teflon or Mylar. The column elements are separated in like manner.

A 3×3 matrix is illustrated to simplify the drawing. However, 100×100 matrices are easily made and 1,000×1,000 matrices are feasible. Also, a simplified electrode structure is illustrated to simplify the drawings. However, in practice, more complicated electrode structures may be employed. The geometry set forth, however, is adequate for illustrating the invention and simplifies the explanation.

Each of the elements 38 and 48 exhibits a natural polarization angle rotation characteristic $\theta_1$, where $\theta_1$ may be 0° or a plus or minus angle. In other words, when there is no energizing control signal applied to the transparent electrodes on the element, the element rotates polarized light applied thereto at some particular angle through an angle $\theta_1$. If, however, an energizing control signal is applied to a particular transparent electrode, the portion of the element energized by the electrode rotates the polarized light applied thereto through some angle $\theta_2$, where $\theta_2$ may be plus or minus and is different than $\theta_1$. According to Malus's Law, the light emerging from a polarizer has an intensity $I_0\sin^2(\theta_2-\theta_1)$, where $I_0$ is the intensity of the incident polarized light. This, therefore, is the intensity of the light emerging from the polarizer 34. The light emerging from polarizer 36 has an intensity $[I_0\sin^2(\theta_2-\theta_1)]\sin^2(\theta_2-\theta_1)$ which equals $I_0\sin^4(\theta_2-\theta_1)$. It may be seen, therefore, that for optimum intensity of emergent light $\theta_2$ minus $\theta_1$ should be equal to 90° and for a polarizer to substantially block incident light $\theta_2$ minus $\theta_1$ should equal 0°.

Consider the case when it is desired to open the light valve at the intersection of row 42 and column 52, that is, the center valve of the matrix. An energizing control signal is applied via line 56 to the transparent row electrode 42 and an energizing control signal is applied via line 58 to the transparent column electrode 52. These control signals may be electrical, magnetic, electromagnetic, acoustic, or mechanical depending on the particular type of element and electrode structure used. It may be seen that light incident on row 42 is transmitted at a polarization angle of $\theta_2$. Light incident on rows 40 and 44 is transmitted at a polarization angle of $\theta_1$. The light emerging from rows 40 and 44, therefore, is polarized at an angle perpendicular to that to which the polarizer 34 is set and is, therefore, substantially blocked by the polarizer 34. The light emerging from row 42, however, is transmitted by the polarizer 34 at an intensity of $I_0 \sin^2(\theta_2-\theta_1)$. If $\theta_2$ for the particular material is 90° and $\theta_1$ is 0°, the emergent light from the polarizer 34 is $I_0$ for row 42 since $\sin^2 90°$ equals 1. The same is true any time $\theta_2-\theta_1$ equals 90°. However, if $\theta_2-\theta_1$ is some number less than 90°, there is some loss. The light transmitted is proportional to $\sin^2(\theta_2-\theta_1)$.

The narrow beam of light from row 42 passing through polarizer 34 then impinges on the element 48. This light is at a polarization angle 90°+$\theta_1$. The light incident on the columns 50 and 54 is rotated through an additional angle $\theta_1$, that is, it is now at a polarization angle of 90°+$\theta_1$+$\theta_1$, relative to the light from source 30. The polarizer 36 is set to block the light at the last polarization angle, that is, it is set at an angle $\theta_1$+90°+$\theta_1$ +90°, that is, 2$\theta_1$+180°. The light from row 44 which passes through the column 52 is rotated through an additional angle $\theta_2$ and is, therefore, now at an angle 90°+$\theta_1$+$\theta_2$ relative to the polarization angle of the light from source 32. If $\theta_2$ is 90°, this means the plane of polarization has been rotated through 180°+$\theta_1$. If now the polarizer 36 is set to 180°+2$\theta_1$ and $\theta_1$ is zero, all of the incident light falling on the column 52, row 42 "intersection" passes through polarizer 36. If $\theta_1$ is some small angle other than zero and $\theta_2$ is 90°, then while all of the nondesired light is blocked, a small amount of the desired light is also blocked, as $\sin^2(\theta_2-\theta_1)$ is some value somewhat less than 1. However, the contrast ratio, that is, the ratio of the passed desired light to the passed nondesired light still approaches infinity because the extinction efficiency of the polarizer may be made very high. In terms of the initial light intensity $I_0$, the light passed by the polarizer 36 is at an intensity $I_0 \sin^4(\theta_2-\theta_1)$ so that if $\theta_2$ is 90° and $\theta_1$ is 0°, the emergent light from the selected valve is at an intensity of $I_0$.

In some ferroelectric and electro-optic matrix structures utilizing this geometry, the light emitted from these elements is either elliptically or circularly polarized which necessitates the placing of quarter wave plate between the element and the polarizer which receives incident light from the element. For example, in the matrix structure of FIG. 2 for the above-mentioned materials there would be a quarter wave plate situated between the element 38 and the polarizer 34 and a quarter wave plate would be situated between the element 48 and the polarizer 36.

Consider the case in which a magneto-optic element such as turbium iron garnet is used for the elements 38 and 48. For optimum emergent light intensity, the turbium iron garnet element would have its dimensions selected so that an unenergized electrode would cause the incident light to be rotated −45° ($\theta_1$) and an energized electrode would cause the incident light to be rotated +45° ($\theta_2$). Let the center valve of the 3×3 matrix again be selected to transmit incident light. The row 42 being energized, therefore, would transmit incident light polarized at an angle of +45°. Polarizer 34 has an axis of polarization of +45° in this case, since 90° plus $\theta_1$ (−45°) equals +45°. The light emergent from this row, therefore, is at an intensity of $I_0$ polarized at +45°. The light from the rows 40 and 44 have their angles of rotation at −45°. This is mutually perpendicular to the axis of polarization of the polarizer 34 which is +45°. The incident light, therefore, from the last-named rows is substantially blocked. The light from row 42 at an intensity of $I_0$ and an angle of +45° then impinges on the element 48. The light emerging from the energized column 52 is polarized, therefore, at an angle of 90° due to the additional rotation of +45° by the column 52. The polarization axis of polarizer 36 is 180° plus 2$\theta_1$ (−90°) which equals +90°. The light emerging from the polarizer 36, therefore, from the column 52 is at an intensity of $I_0$ at a polarization angle of +90°. The light incident on the columns 50 and 54 is at an intensity of $I_0$ and an angle of +45° is rotated −45° ($\theta_1$). The light emerging from these columns, therefore, is at an intensity of $I_0$ and at an angle of 0°. Since this polarized light is mutually perpendicular to the axis of polarization of the polarizer 36 the light is substantially blocked. The only light transmitted, therefore, is the light from the center valve of the matrix.

It may be seen that if a ferroelectric such as PZT were used in a fine-grained 180° partial switching mode and the elements 38 and 48 had their dimensions selected such that $\theta_1$ equaled +10° and $\theta_2$ equaled +100° maximum light intensity for a selected valve would be achieved as may be proven by inserting these values into the equations set forth for the matrix of FIG. 2. If a first order electro-optic material such as KDP were utilized for the elements 38 and 48, it may be seen that the proper choice of dimensions of the elements may result in $\theta_1$ being equal to −45° and $\theta_2$ being equal to +45°. This, it may be seen, would result in a maximum transmission of light for a selected valve in the same manner as described for the magneto-optic material turbium iron garnet. In a second order electro-optic crystal $\theta_2$ would equal 90° and $\theta_1$ would equal 0°. Many other such examples of elements and selection of dimensions which result in a particular $\theta_1$ and $\theta_2$ shall be apparent to those skilled in the art. It should further be apparent to those skilled in the art that $\theta_2$ minus $\theta_1$ need not be equal to 90° for a workable matrix. The prime consideration is that the polarizers 34 and 36 have their angles of polarization chosen such that incident light from an unenergized electrode is substantially blocked by the polarizer. Therefore, even though $\theta_2$ minus $\theta_1$ is not equal to 90° an infinite contrast ratio is still achieved between the light emergent from a selected and an unselected valve, as was explained before, since the extinction efficiency of the polarizer may be made very high.

What is claimed is:

1. In combination:

means producing polarized light;

first means comprising a first optically active element formed with a first plurality of elongated conductors thereon in the path of said light, and formed also with additional conductor means thereon, said first means responsive to a control signal selectively applied between ones of said conductors and said additional conductor means for causing the light passing in the vicinity of conductors to which said signal is applied to have one polarization and the light passing in the vicinity of said remaining conductors to have a different polarization;

means for selectively applying a control signal between at least one of said conductors and said additional conductor means;

polarization angle discriminator means in the path of the light passing through the first means for passing that portion of the light at said one polarization and substantially blocking that portion of the light at said different polarization;

second means comprising a second optically active element formed with a second plurality of elongated conductors thereon, lying at an oblique angle to said first plurality of conductors and in the path of the light passed through said polarization discriminator means and formed also with a second additional conductor means thereon, said second means responsive to a control signal selectively applied between ones of said second conductors and said second conductor means for changing the angle of polarization of the passed light one amount in the vicinity of said second conductors to which said control signal is applied and for changing the angle of polarization of the passed light another amount in the vicinity of said remaining conductors;

means for selectively applying a control signal between at least one of said second plurality of conductors and said second additional conductor means; and second polarization angle discriminator means in the path of the light passing through the second means for passing that portion of the light whose angle of polarization has been changed one amount and substantially blocking the remainder of the light.

2. In the combination as set forth in claim 1, said first and second optically active elements each comprising a ferroelectric element.

3. In the combination as set forth in claim 1, said first and second optically active elements each comprising an electrooptic crystal.

4. In the combination as set forth in claim 1, said first and second optically active elements each comprising a magneto-optic element.

5. In the combination as set forth in claim 1, said control signals comprising electrical signals.

6. In a matrix system for selecting the path taken by a light beam, the combination comprising:

a source of polarized light;

a light-responsive matrix in the path of the light, each row-column intersection of said matrix being a path for the light;

a first optically active element upon which a plurality of rows of the matrix are formed and upon which a first conductor means is also formed, the rows being responsive to a selectively applied energizing signal for changing the polarization of light;

a second optically active element upon which a plurality of columns of the matrix are formed and upon which a second conductor means is also formed, the columns being responsive to a selectively applied energizing signal for changing the polarization of light;

first means placed between the rows and columns of said matrix, said first means being responsive to the angle of polarization of light for varying the intensity of the light;

means for providing an energizing signal between selected ones of said rows and said first conductor means, an unenergized row passing light at a first angle of polarization and an energized row rotating the light to a second angle of polarization, said first means being positioned to pass light at said second angle of polarization and to substantially block light at said first angle of polarization;

second means responsive to the angle of polarization of light passed through said columns for varying the intensity of the light; and means for providing an energizing signal between selected ones of said columns and said second conductor means, an unenergized column passing light at a first angle of polarization and an energized column rotating the light to a second angle of polarization, said second means being positioned to pass light at said second angle of polarization and to substantially block light at said first angle of polarization.

7. In combination:

a source of light;

first, second and third polarizers placed in the light path from said source;

a first optically active element situated between said first and second polarizers;

a first plurality of spaced electrodes located on one surface of said first optically active element and a first additional electrode means located on the opposite surface thereof, selected ones of said first electrodes being responsive to a control signal applied between said selected ones of said first electrodes and said first additional electrode means for changing the polarization of light passing through the portion of the element energized by said electrodes;

a second optically active element situated between said second and third polarizers;

a second plurality of spaced electrodes located on a surface of said second optically active element which is parallel to that on which said first plurality of electrodes is located and a second additional means located on a surface of said second optically active element opposite said second plurality of electrodes, said second electrodes extending at an angle to said first electrodes, selected ones of said second electrodes being responsive to a control signal applied between said selected ones of said second electrodes and said second additional electrode means for changing the polarization of light passing through the portion of the element energized by said second electrodes;

means for applying a control signal between selected ones of said first plurality of electrodes and said first additional electrode means, a portion of the element controlled by an unselected electrode passing light at a first angle of polarization and a portion of the element controlled by a selected electrode rotating the light to a second angle of polarization, said second polarizer being positioned to pass light at said second angle of polarization and to substantially block light at said first angle of polarization; and means for applying a control signal between selected ones of said second plurality of electrodes and said second additional electrode means, a portion of the element controlled by an unselected electrode passing light at a first angle of polarization and a portion of the element controlled by a selected electrode rotating the light to a second angle of polarization, said third polarizer being positioned to pass light at said second angle of polarization and to substantially block light at said first angle of polarization.

8. In a light valve matrix the combination comprising:

a source of polarized light;

first and second polarizers place in the light path from said source;

a first optically active element placed between said source and said first polarizer, the rows of said matrix being defined thereon by a first plurality of transparent electrodes and a first additional electrode means, the electrodes being responsive to an energizing signal applied between selected row electrodes and said first additional electrode means for changing the polarization of light passing through the surface adjacent said selected electrodes;

a second optically active element placed between said first and second polarizer, the columns of the matrix being defined thereon by a second plurality of transparent electrodes and a second additional electrode means, the electrodes being responsive to an energizing signal applied between selected column electrodes and said second additional electrode means for changing the polarization of light passing through the surface adjacent said selected electrodes, the intersection of a row and a column forming a light valve;

means for energizing selected ones of said first plurality of electrodes, a row defined by an unselected electrode passing light at a first angle of polarization and a row defined by a selected electrode rotating the light to a second angle of polarization, said first polarizer being positioned to pass light at said second angle of polarization and to substantially block light at said first angle of polarization; and means for energizing selected ones of said second plurality of electrodes, a column defined by an unselected electrode passing light at a first angle of polarization and a column defined by a selected electrode rotating the light to a second angle of polarization, said second polarizer being positioned to pass light at said second angle of polarization and to substantially block light at said first angle of polarization.

UNITED STATES PATENT OFFICE
CERTIFICATE OF CORRECTION

Patent No. 3,614,200     Dated October 19, 1971

Inventor(s) George William Taylor

It is certified that error appears in the above-identified patent and that said Letters Patent are hereby corrected as shown below:

In Column 5, line 37, "second conductor" should read ---second additional conductor---. In column 7, line 1, "place" should read ---placed---.

Signed and sealed this 11th day of July 1972.

(SEAL)
Attest:

EDWARD M. FLETCHER, JR.          ROBERT GOTTSCHALK
Attesting Officer                Commissioner of Patents